Oct. 2, 1956 N. BUITENKANT 2,764,821

METHODS OF INSTRUCTION IN COMPONENT LOCATION AND TROUBLE-SHOOTING IN COMPLICATED EQUIPMENT AND MEANS FOR TESTING ACCURACY OF ANSWERS

Filed Aug. 25, 1953 10 Sheets-Sheet 1

INVENTOR.
NATHAN BUITENKANT
BY
Eugene S. Lovette

Oct. 2, 1956 N. BUITENKANT 2,764,821

METHODS OF INSTRUCTION IN COMPONENT LOCATION AND TROUBLE-SHOOTING IN COMPLICATED EQUIPMENT AND MEANS FOR TESTING ACCURACY OF ANSWERS

Filed Aug. 25, 1953 10 Sheets-Sheet 2

INVENTOR.
NATHAN BUITENKANT
BY
Eugene S. Lovette

INVENTOR.
NATHAN BUITENKANT
BY Eugene S. Lovette

16

Circuit tracing problems

Location of Components from Circuit Designation

1. Locate Z505
2. Locate R560
3. Locate V517
4. Locate T505
5. Locate V512
6. Locate J502
7. Locate Z511
8. Locate C543
9. Locate V511
10. Locate R516

20 20

Location of Components from Functional Description

1. Locate the input potentiometer for the audio output stage.
2. Locate the BFO variable tuning capacitor.
3. Locate the screen bypass capacitor for the right BDI RF amplifier. (20a)
4. Locate the component containing the tuned circuits for the RF converter output and the IF amplifier input.
5. Locate the left BDI RF amplifier input transformer.

Location of Components from Understanding of Circuit Operation

1. Locate the component where you would make your first checks to find whether the receiver tubes were receiving plate voltage.
2. Locate all coupling capacitors through which audio frequencies pass on their way to the receiver audio output.
3. Locate those components which must be adjusted while aligning the sound channel IF amplifier. (20b)
4. Locate the component that must be adjusted if parts replacement causes the BDI switching oscillator frequency to change.
5. Locate the one component you would check first in the event that the receiver showed exceptionally slow or fast recovery of RCG.

FIG 4.

INVENTOR.
NATHAN BUITENKANT
BY Eugene S. Lovette

Oct. 2, 1956 N. BUITENKANT 2,764,821

METHODS OF INSTRUCTION IN COMPONENT LOCATION AND TROUBLE-SHOOTING IN COMPLICATED EQUIPMENT AND MEANS FOR TESTING ACCURACY OF ANSWERS

Filed Aug. 25, 1953 10 Sheets-Sheet 5

CIRCUIT TRACING

*for*

THE QGB SONAR EQUIPMENT

*major component* : THE RECEIVER

INVENTOR
NATHAN BUITENKANT
BY
Eugene S. Lovette

Oct. 2, 1956 N. BUITENKANT 2,764,821

METHODS OF INSTRUCTION IN COMPONENT LOCATION AND TROUBLE-SHOOTING IN COMPLICATED EQUIPMENT AND MEANS FOR TESTING ACCURACY OF ANSWERS

Filed Aug. 25, 1953 10 Sheets-Sheet 6

CIRCUIT TRACING

*for*

THE QGB SONAR EQUIPMENT

*major component* : THE RECEIVER

INVENTOR.
NATHAN BUITENKANT
BY
Eugene S. Lovett

Oct. 2, 1956 N. BUITENKANT 2,764,821

METHODS OF INSTRUCTION IN COMPONENT LOCATION AND TROUBLE-SHOOTING IN COMPLICATED EQUIPMENT AND MEANS FOR TESTING ACCURACY OF ANSWERS

Filed Aug. 25, 1953 10 Sheets-Sheet 7

INVENTOR
NATHAN BUITENKANT
BY
Eugene S. Lovette

INVENTOR.
NATHAN BUITENKANT
BY
Eugene S. Louette

COMMON FAILURE NO. R-1

Receiver conditions

| From Socket | Pin | To | Resistance (Ohms) | Voltage (DC unless stated) | Signal Condition |
|---|---|---|---|---|---|
| X 501 (6SN7) | 1 | GND | | | |
| | 2 | GND | | | |
| | 3 | X 501-5 | | | |
| | 4 | GND | | | |
| | 5 | GND | | | |
| | 6 | Z 502-B | | | |
| | 7 | J 502-7 | | | |
| | 8 | V 503-6 | | | |
| X 502 (6SN7) | 1 | GND | | | |
| | 2 | GND | | | |
| | 3 | X 502-5 | | | |
| | 4 *1 | X 512-4 | | | |
| | 4 *2 | X 512-4 | | | |
| | 5 | X 512-5 | | | |
| | 5 *1 | GND | | | |
| | 6 | GND | | | |
| | 7 | -- | | | |
| | 8 | X 512-8 | | | |
| X 503 (6SQ7) | 1 | GND | | | |
| | 2 | GND | | | |
| | 3 | X 503-5 | | | |
| | 4 | X 504-4 | | | |
| | 5 | X 504-5 | | | |
| | 6 | GND | | | |
| | 7 | -- | | | |
| | 8 | Z 503-C | | | |
| X 504 (6SQ7) | 1 | GND | | | |
| | 2 | GND | | | |
| | 3 | X 504-6 | | | |
| | 4 | -- | | | |
| | 5 | -- | | | |
| | 6 | GND | | | |
| | 7 | -- | | | |
| | 8 | GND | | | |
| X 505 (6H6) | 1 | GND | | | |
| | 2 | GND | | | |
| | 3 | GND | | | |
| | 4 | GND | | | |
| | 5 | GND | | | |
| | 6 | -- | | | |
| | 7 | -- | | | |
| | 8 | GND | | | |
| | 8 | X 509-5 | | | |
| X 506 (6J5) | 1 | GND | | | |
| | 2 | GND | | | |
| | 3 | -- | | | |
| | 4 | -- | | | |
| | 5 | GND | | | |
| | 6 | -- | | | |
| | 7 | -- | | | |
| | 8 | GND | | | |
| X 507 (6J5) | 1 | GND | | | |
| | 2 | GND | | | |
| | 3 | X 510-8 | | | |
| | 4 | -- | | | |
| | 5 | GND | | | |
| | 6 | -- | | | |
| | 7 | -- | | | |
| | 8 | GND | | | |
| X 508 (6J5) | 1 | GND | | | |
| | 2 | GND | | | |
| | 3 | X 514-3 | | | |
| | 4 | -- | | | |
| | 5 | GND | | | |
| | 5 | X 509-5 | | | |
| | 6 | -- | | | |
| | 7 | -- | | | |
| | 8 | T 502-2 | | | |
| X 509 (6H6) | 1 | GND | | | |
| | 2 | GND | | | |
| | 3 | -- | | | |
| | 4 | GND | | | |
| | 5 | -- | | | |
| | 6 | -- | | | |
| | 7 | J 503-7 | | | |
| | 8 | J 502-5 | | | |
| X 510 (6SN7) | 1 | X 510-2 and GND | | | |
| | 2 | -- | | | |
| | 3 | X 510-5 | | | |
| | 4 | GND | | | |
| | 4 | V 509-3 | | | normal |
| | 5 | GND | | | |
| | 6 | GND | | | |
| | 6 | X 520-4 | | | |
| | 7 | -- | | | |
| | 8 | J 502-6 | 940,000 | 0 | no sig. |
| X 511 (6SN7) | 1 | GND | | | |
| | 2 | GND | | | |
| | 3 | X 511-3 | | | |
| | 4 | GND | | | |
| | 4 | Z 505-d | | | |
| | 5 | GND | | | |
| | 6 | X 515-4 | | | |
| | 7 | -- | | | |
| | 8 | X 520-4 | | | |
| X 512 (6SN7) | 1 | GND | | | |
| | 2 | GND | | | |
| | 3 | X 502-4 | | | |
| | 4 | -- | | | |
| | 5 | -- | | | |
| | 6 | GND | | | |
| | 7 | -- | | | |
| | 8 | -- | | | |

| From Socket | Pin | To | Resistance (Ohms) | Voltage (DC unless stated) | Signal Condition |
|---|---|---|---|---|---|
| X 513 (6J5) | 1 | GND | | | |
| | 2 | GND | | | |
| | 3 | X 516-6 | | | |
| | 4 | -- | | | |
| | 5 | GND | | | |
| | 6 | -- | | | |
| | 7 | -- | | | |
| | 8 | GND | | | |
| X 514 (6J5) | 1 | GND | | | |
| | 2 | GND | | | |
| | 3 | -- | | | |
| | 4 | -- | | | |
| | 5 | GND | | | |
| | 6 | -- | | | |
| | 7 | -- | | | |
| | 8 | GND | | | |
| X 515 (6V6) | 1 | GND | | | |
| | 2 | GND | | | |
| | 3 | T 504-1 | | | |
| | 4 | J 503-6 | | | |
| | 5 ** | GND | | | |
| | 5 *7 | GND | | | |
| | 6 | -- | | | |
| | 7 | -- | | | |
| | 8 | GND | | | |
| X 516 (6SQ7) | 1 | GND | | | |
| | 2 | GND | | | |
| | 3 | X 516-5 | | | |
| | 4 | GND | | | |
| | 4 ** | X 512-4 | | | |
| | 5 | X 517-5 | | | |
| | 6 | -- | | | |
| | 7 | J 503-7 | | | |
| | 8 | Z 506-C | | | |
| X 517 (6SQ7) | 1 | GND | | | |
| | 2 | GND | | | |
| | 3 | X 517-6 | | | |
| | 4 | J 503-12 | | | |
| | 5 | -- | | | |
| | 6 | GND | | | |
| | 6 | X 510-8 | | | |
| | 7 | -- | | | |
| | 8 | Z 510-C | | | |
| X 518 (6SQ7) | 1 | GND | | | |
| | 2 | GND | | | |
| | 3 | X 518-5 | | | |
| | 4 | GND | | | |
| | 5 | GND | | | |
| | 6 | X 519-8 | | | |
| | 7 | J 503-7 | | | |
| | 8 ** | X 519-3 | | | |
| X 519 (6J5) | 1 | GND | | | |
| | 2 | GND | | | |
| | 3 | -- | | | |
| | 4 | -- | | | |
| | 5 | GND | | | |
| | 6 | -- | | | |
| | 7 | -- | | | |
| | 8 | GND | | | |
| X 520 (6V6) | 1 | GND | | | |
| | 2 | GND | | | |
| | 3 | T 505-1 | | | |
| | 4 | -- | | | |
| | 5 ** | GND | | | |
| | 6 | -- | | | |
| | 7 | J 503-7 | | | |
| | 8 | GND | | | |
| X 521 (6H6) | 1 | GND | | | |
| | 2 | GND | | | |
| | 3 | GND | | | |
| | 4 | GND | | | |
| | 5 | -- | | | |
| | 6 | -- | | | |
| | 7 | -- | | | |
| | 8 | GND | | | |
| Z 504 | 1 | GND | | | |
| Z 508 | 2 | GND | | | |
| | 3 | Z 501-A | | | |
| | 4 | GND | | | |
| | 5 | J 501-C | | | |
| | 5 *6 | GND | | | |
| Z 509 | 2 | J 501-A | | | |
| | 3 | Z 505-A | | | |
| | 4 | GND | | | |
| | 5 | GND | | | |
| J 503 | 3 | X 514-4 | | | |
| | 4 | GND | | | |
| | 5 | X 510-7 | | | |
| | 6 | A 505-5 | | | |
| | 7 | X 514-7 and V517-7 | | | |
| | 8 | GND | | | |
| | 9 | J 504-5 | | | |
| | 10 | Blank | | | |
| | 11 | J 502-1 & C587-8 | | | |
| | 12 | C 523-8 and C 542-8 | | | |
| J 502 | 1 | Blank | | | |
| | 2 | GND | | | |
| | 3 | T 504-5 | | | |
| | 4 | T 504-3 | | | |
| | 5 | X 509-8 | | | |
| | 6 | A 505-8 | | | |
| | 7 | X 509-5 & A504-6 | | | |
| | 8 | Blank | | | |

* 1 BDI switch on Right
* 2 BDI switch on Operate
* 3 R50( set at minimum
* 4 Volume control at minimum
* 5 Volume control at maximum
* 6 Recorder control on zero
* 7 Recorder and Audio controls at maximum
* 8 Left-Right switch in Balance position
* 9 BFO "OUT," no input signal
*10 Peak-Flat switch (S503) on Flat
*11 Filter in
*12 Filter out
*13 Recorder and Audio controls full clockwise
*14 RCG off, equipment not keyed
*15 S501 depressed

FIG 8.

INVENTOR.
NATHAN BUITENKANT
BY Eugene S. Lavette

Oct. 2, 1956 N. BUITENKANT 2,764,821

METHODS OF INSTRUCTION IN COMPONENT LOCATION AND TROUBLE-SHOOTING IN COMPLICATED EQUIPMENT AND MEANS FOR TESTING ACCURACY OF ANSWERS

Filed Aug. 25, 1953 10 Sheets-Sheet 10

TROUBLESHOOTING

*for* THE QGB SONAR EQUIPMENT

*major component*: THE RECEIVER

*trouble symptoms*:

The QGB system operates in a normal manner except that there is no horizontal deflection on the BDI 'scope screen—no reverberations or echoes appear. A systems check indicates that the cause of this trouble is in the receiver. BuShips records show that this particular trouble is often caused by the breakdown of a single component.

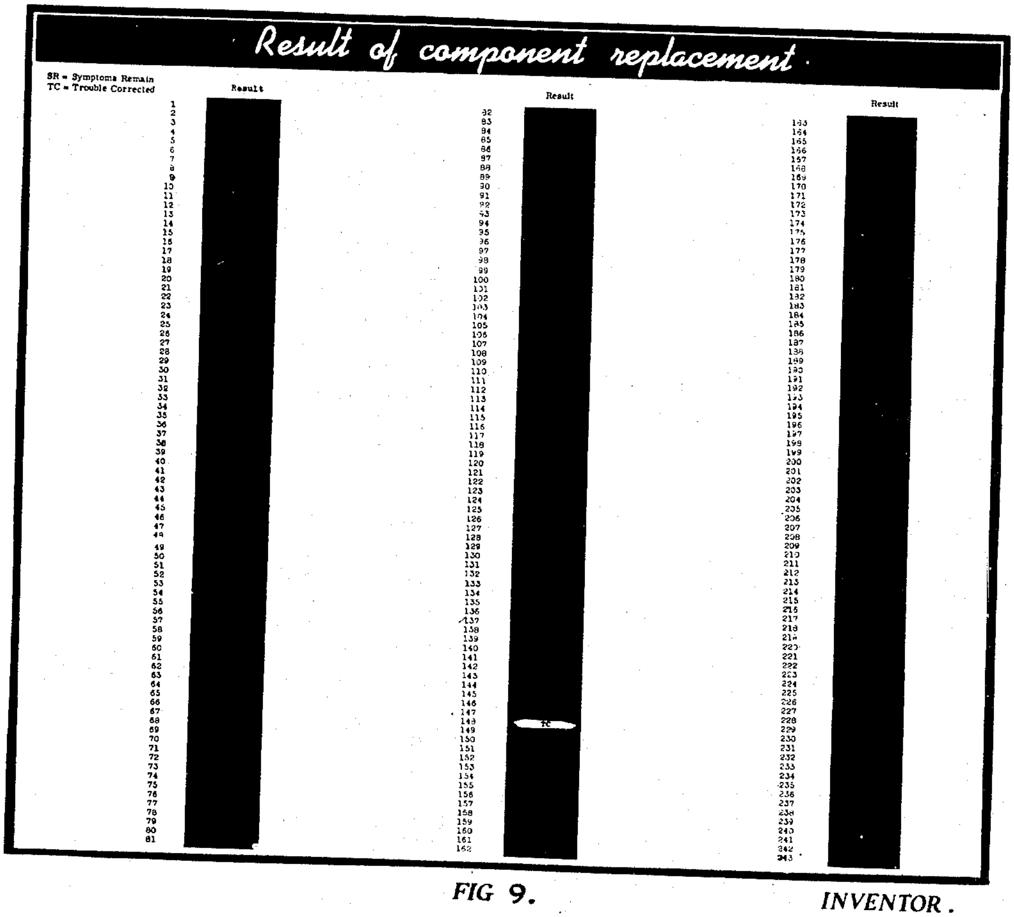

FIG 9.

INVENTOR.
NATHAN BUITENKANT
BY Eugene S. Lovette

United States Patent Office 2,764,821

Patented Oct. 2, 1956

2,764,821

METHODS OF INSTRUCTION IN COMPONENT LOCATION AND TROUBLE-SHOOTING IN COMPLICATED EQUIPMENT AND MEANS FOR TESTING ACCURACY OF ANSWERS

Nathan Buitenkant, Douglaston, N. Y., assignor to Van Valkenburgh, Nooger & Neville, Inc., New York, N. Y., a corporation of New York Application August 25, 1953, Serial No. 376,472

12 Claims. (Cl. 35—9)

This invention relates to improvements in methods of instruction in component location and troubleshooting in complicated equipment and means of testing accuracy of answers.

One of the objects of this invention is to provide for a trainee or student a general training in situations wherein a solution to established conditions requires a logical procedure of trial and response, and embodies an efficient method and means for instruction of trainees in component location or circuit-tracing and troubleshooting in large and complicated apparatus, such as sonar equipment, without utilizing the costly equipment per se for the purpose.

Another object of my invention is, in a method and means of instruction in circuit-tracing of the character specified, (1) to provide a student trainee with training in locating chassis circuits and components; (2) to provide for the performance-testing of trainee's ability to locate chassis circuits and the components thereof; and (3) to provide for performance-testing of trainee's understanding of the equipment operation through location and identification by the trainee of functional parts of such chassis circuits and components, all without utilizing the costly actual equipment, per se.

Another object of my invention is, in a course of instruction on troubleshooting of the character specified, to provide a trainee with a proper training in logical troubleshooting procedures through (1) a means of locating faulty components through providing diagrammatic representations of the equipment instead of the actual equipment; (2) to provide for performance-testing of trainee's knowledge of the logical troubleshooting procedures by presenting practical troubleshooting problems which will result in locating by the trainee of the faulty component; and (3) to provide in such method of instruction a means which will immediately indicate to the trainee and subsequently to an instructor the correctness of trainee's answer to a question propounded.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Figs. 1A, 1B, 1C and 1D are blown up views (hereinafter referred to as pull-outs) of those portions of the schematic diagram of Fig. 1 referred to in the body of the instant specification and are provided to facilitate reading of same;

Figs. 2A, 2B, 2C and 2D are pull-outs of portions of Fig. 2 referred to in the body of the instant specification;

Figs. 3B, 3D, 3E and 3F are pull-outs of Figs. 3A and 3C;

Fig. 4 is a view in plan of a circuit-tracing testing chart specifying a list of problems in regard to location of various components from circuit designation of the receiver shown in Figs. 1 to 3; also specifying list of problems of location of components from functional description and list of location of components derived from understanding of circuit operation;

Figure 6:
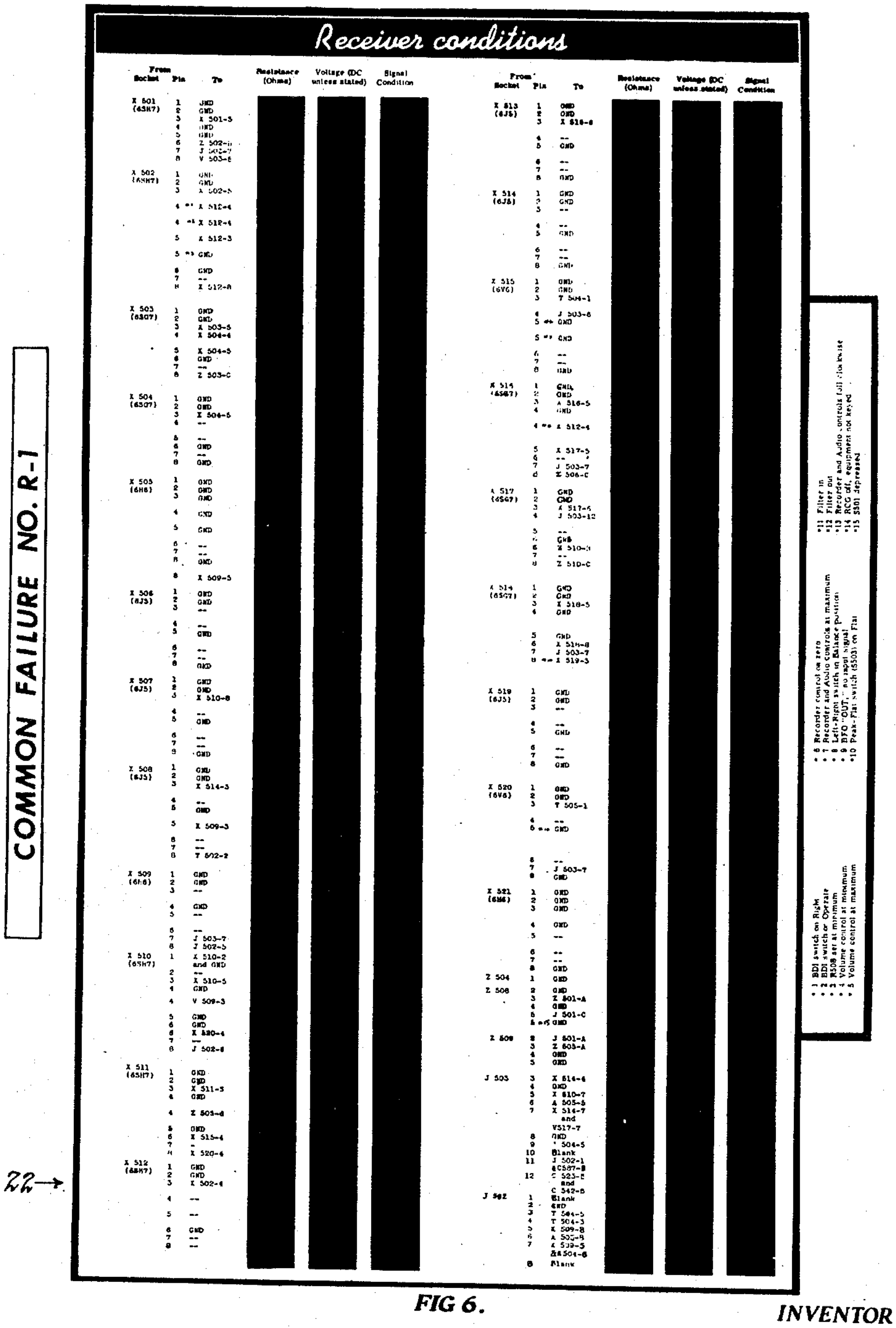
Fig. 6 is a view in plan of a troubleshooting testing chart embodying lists of solution indications of common failures and relating to resistance, voltage and signal condition of a receiver such as shown in Figs. 1 to 5, which indications are covered and adapted to be uncovered by trainee to show individual conditions.
Figure 7:
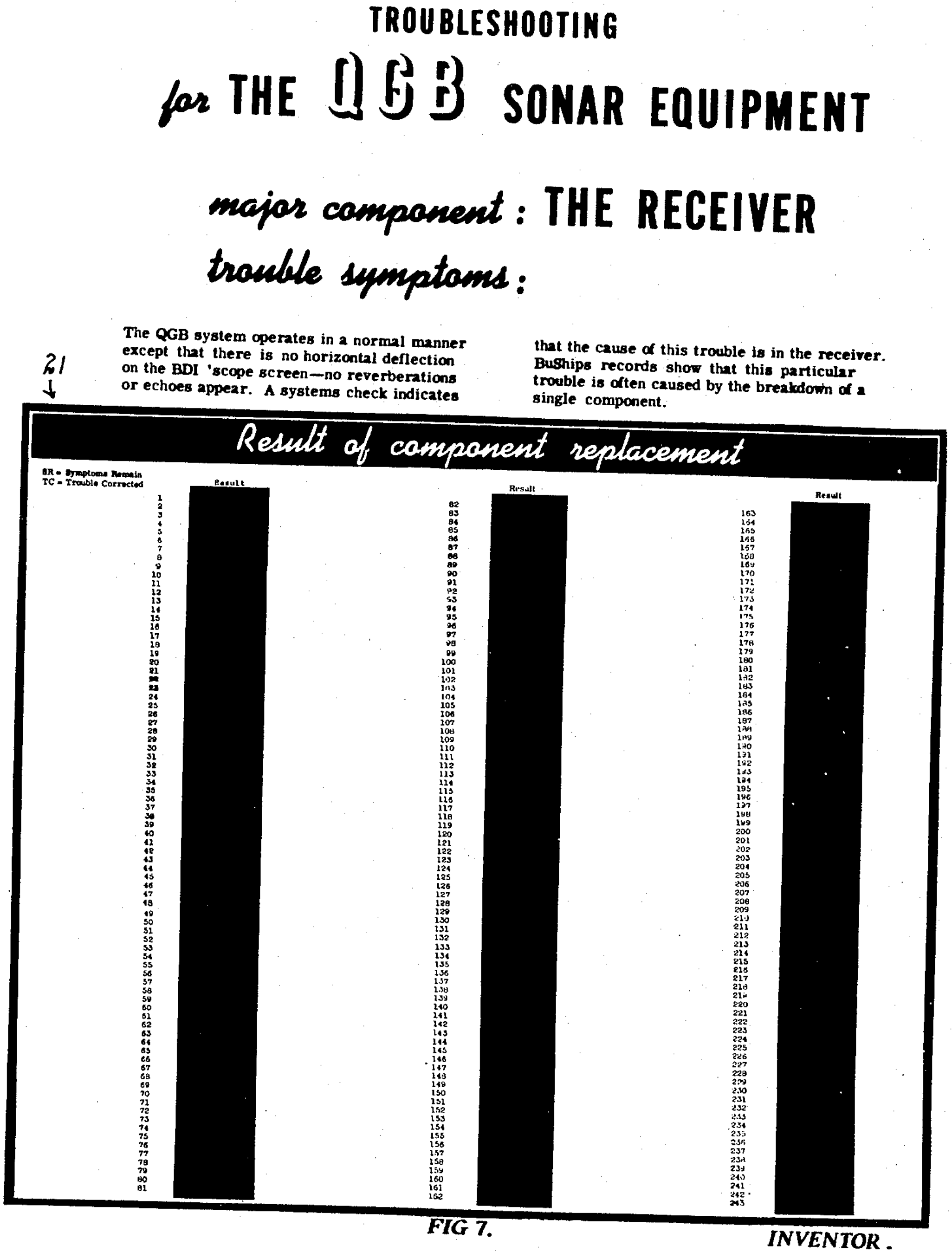
Fig. 7 is a chart specifying a trouble-symptom problem and embodying covered lists of solution indications of results of component replacement, the indication-covering portions of which lists are adapted to be individually uncovered by the trainee to indicate the result of component replacement in a given case or series of cases.

Fig. 8 is a chart embodying a list of solution indications relating to receiver conditions similar to Fig. 6, some of which have been uncovered by the trainee in response to the question propounded; and Fig. 9 is a chart embodying a list of solution indications referring to the result of component replacement similar to Fig. 7, one of which has been uncovered by the trainee in response to the question propounded.

Referring now to these drawings which illustrate a preferred embodiment of my invention, I provide a method of instruction and a means of testing the trainee which will comprise a substitute for the equipment per se when such equipment is not available and will enable evaluation of answers by the trainee and consequently by the use of my method and means each trainee or student may be provided with a training experience equivalent to that which would be acquired if he were working with real equipment. My study and training apparatus provides both training experience on an equipment and also a simple and easy performance test of the trainee's or student's learning.

For instructional purposes, at an equipment-student ratio of 1:1, my study and training apparatus is best used as a performance-testing device. When real equipment is available at an equipment-student ratio of less than 1:1, the study and training apparatus is usable both as a method of simulating training on real equipment and as a performance test of the student's or trainee's knowledge. As will be developed by the specifications, my study and training apparatus provides a 1:1 student-equipment ratio and a 1:1 student-teacher ratio.

In circuit-tracing my study and training apparatus is particularly adapted to instruct the trainee in regard to the circuit-tracing and troubleshooting aspects of equipment maintenance and repair.

*Circuit-tracing*

Figure 1:
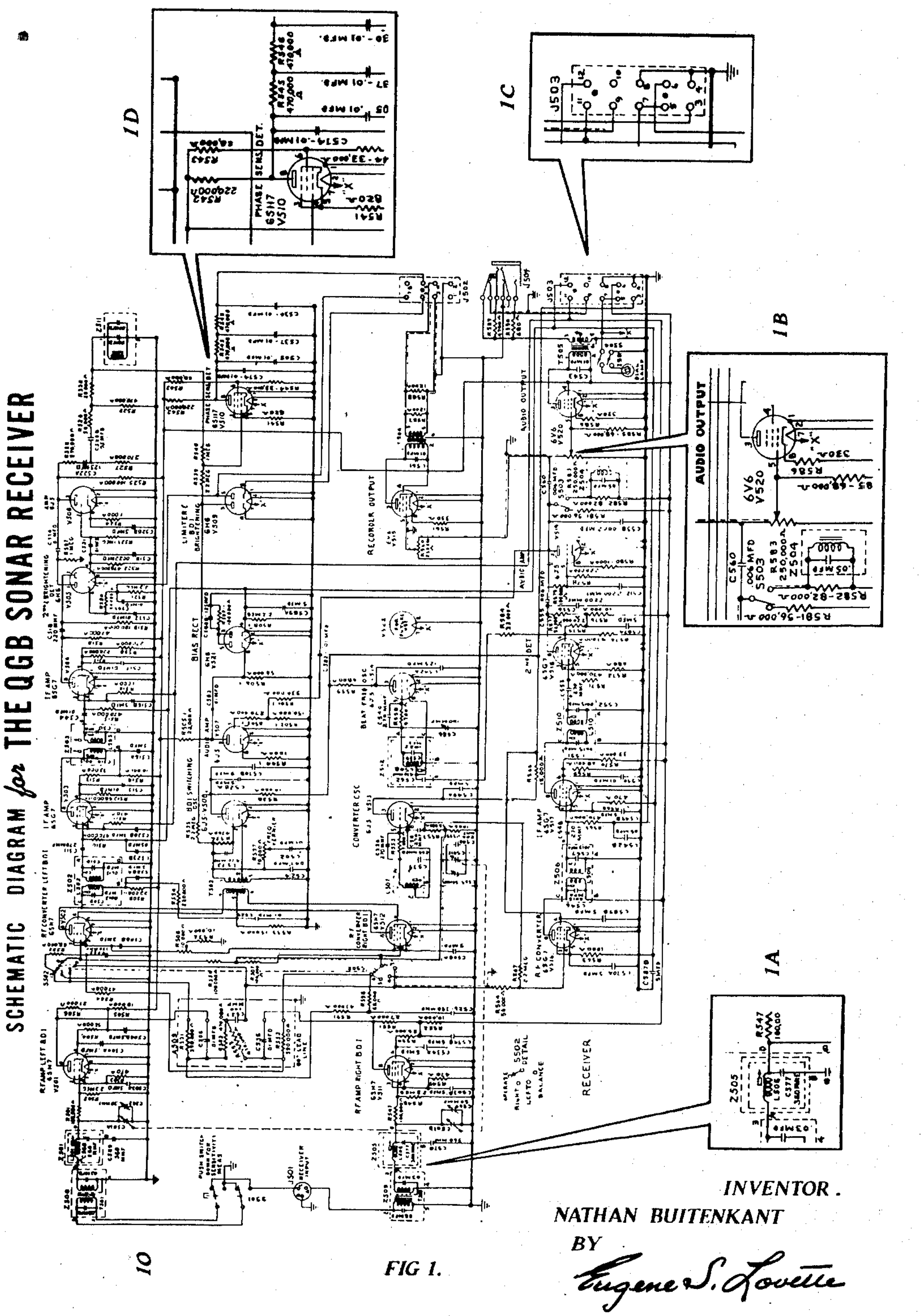
Fig. 1 is a reproduction of a chart disclosing a schematic diagram of various electronic units in a receiver of a well-known system of sonar equipment.
Figure 2:
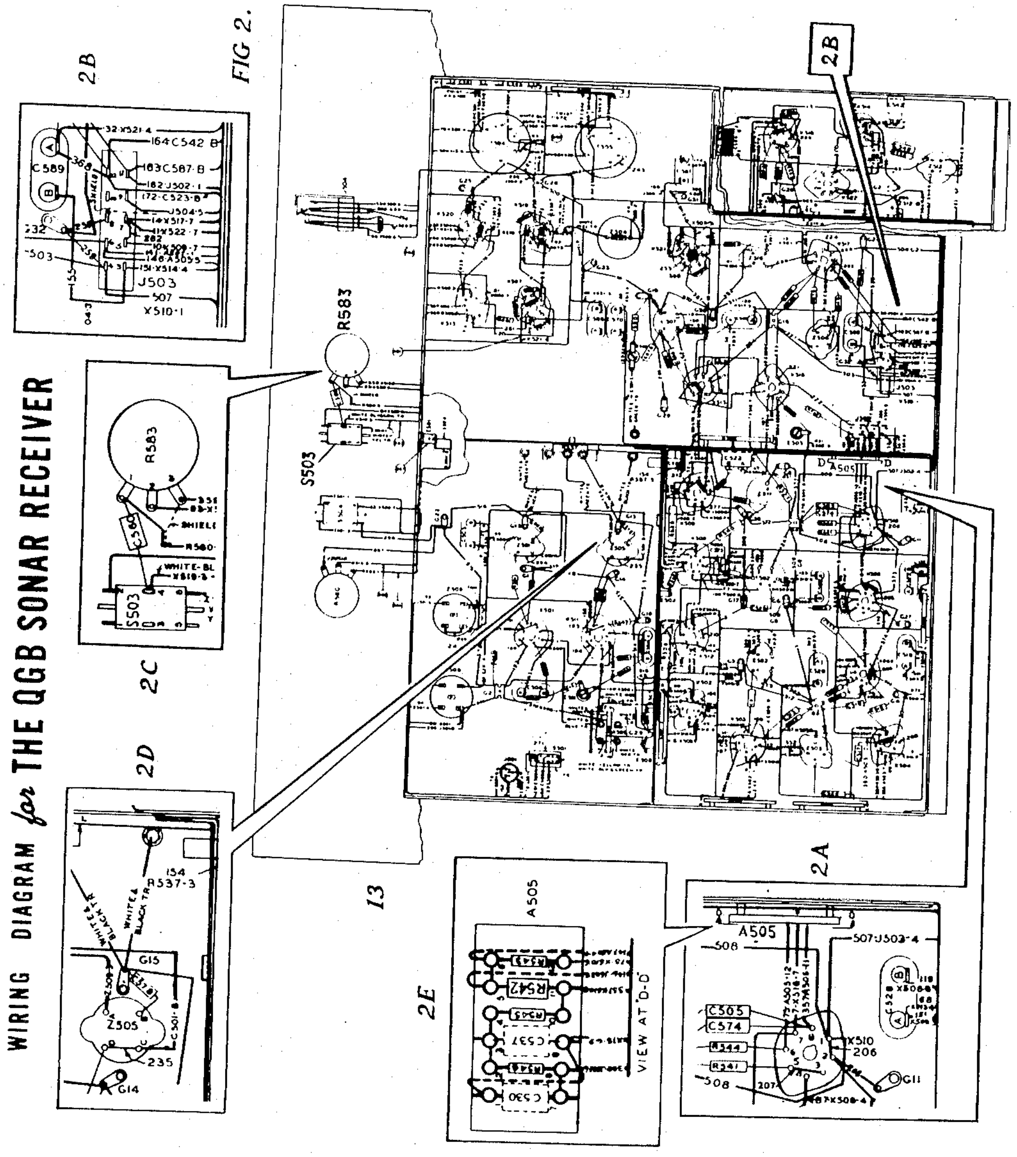
Fig. 2 is a reproduction of a chart disclosing a wiring diagram of the receiver shown in Fig. 1.

The circuit-tracing aspects are described as follows:

In Fig. 1 my chart 10 embodies a schematic diagram of various electronic units of a receiver of the well-known QGB sonar equipment and provides the student, or trainee, with a symbolic representation of the equipment's arrangement and function, while the wiring diagram shown on the chart 13 in Fig. 2 relates the symbols of the schematic diagram of Fig. 1 to reality by indicating where the various components are physically located in the equipment.

Figure 3:
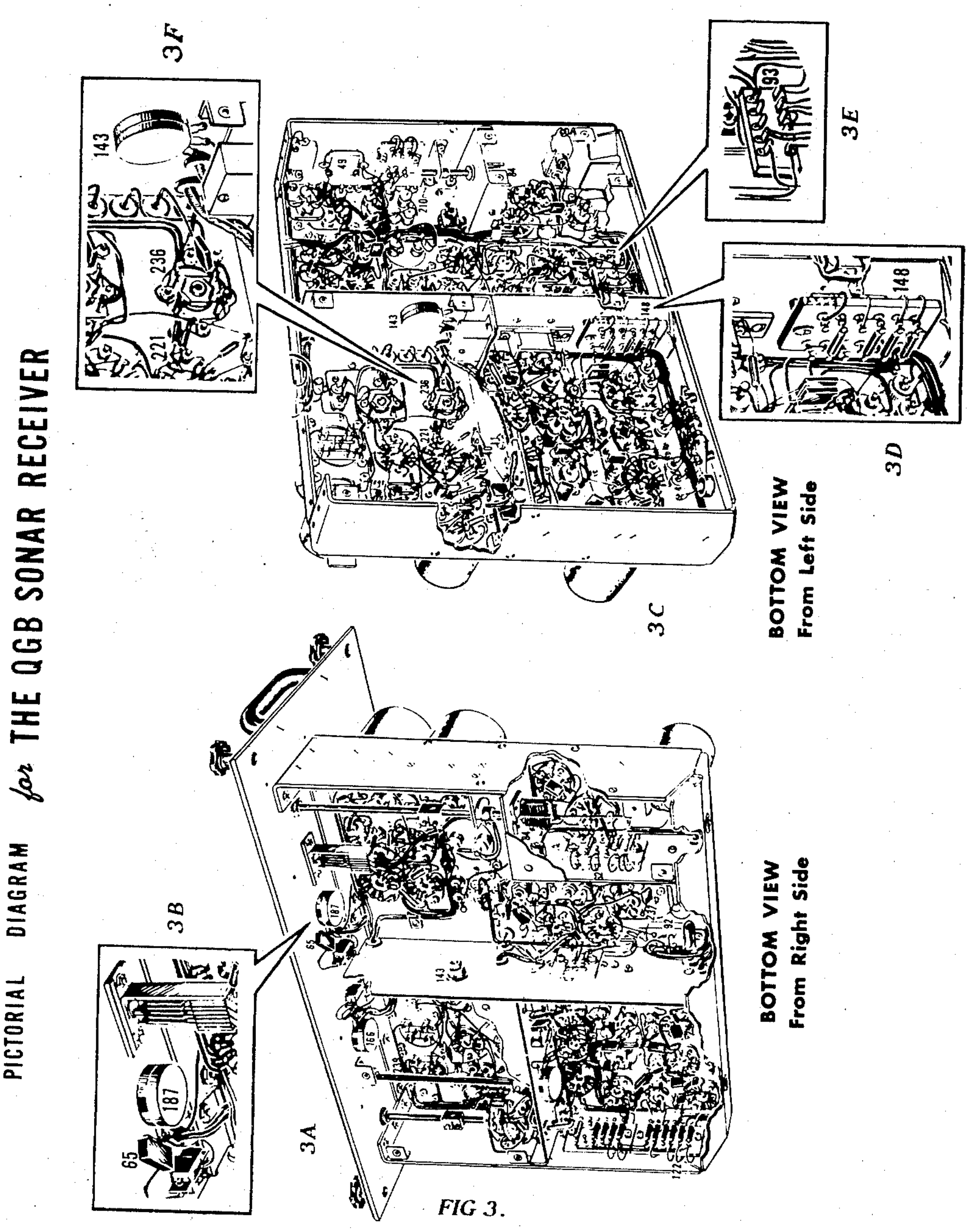
Fig. 3 is a reproduction of a chart showing pictorial diagrams of the bottom views from, respectively, the right side, Fig. 3A, and the left side, Fig. 3C, of the inside of the receiver chassis of the equipment shown in Figs. 1 and 2.

In Fig. 3 the pictorial diagrams 3A and 3C present a realistic view of the actual equipment. In said Fig. 3, a number of components have been assigned an arbitrary number differing from those references by indications on Figs. 1 and 2.

Figure 5:
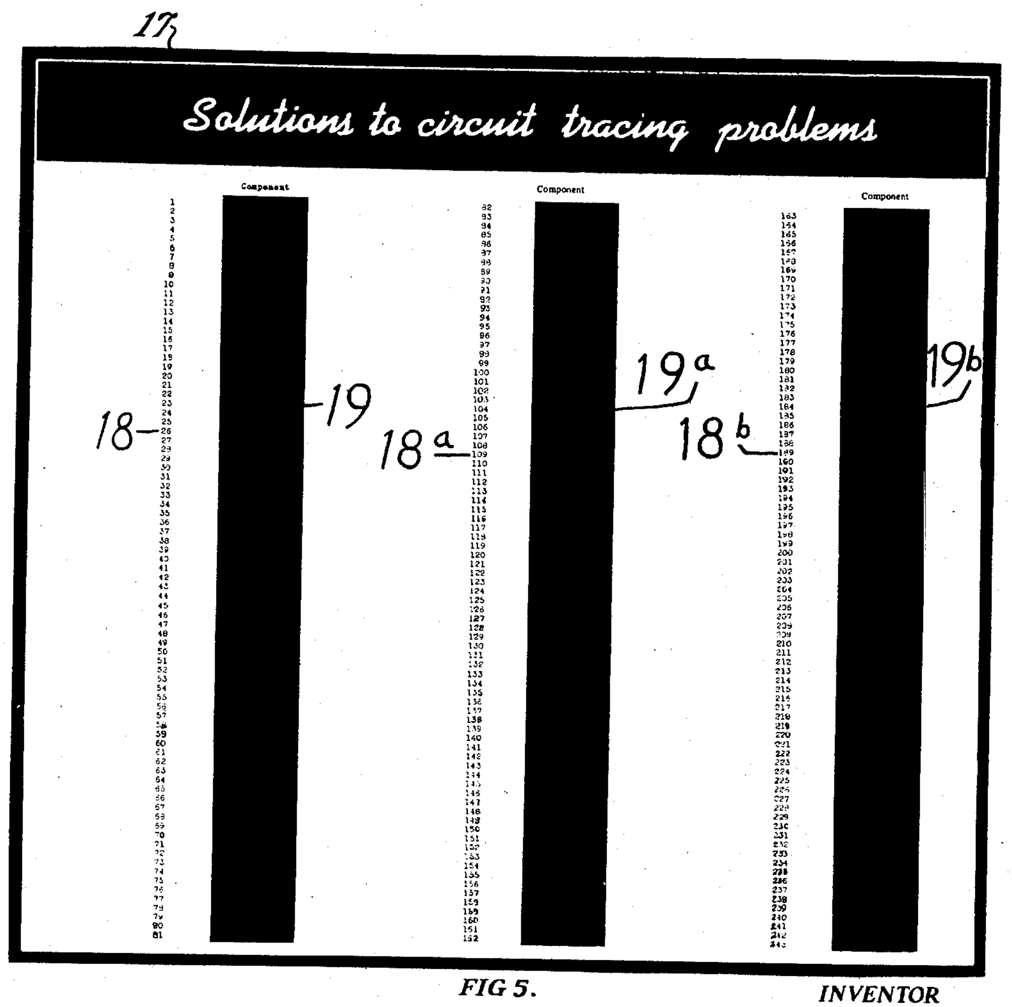
Fig. 5 is a chart embodying a list of solution indications to circuit-tracing problems which are covered and adapted to be individually uncovered by the trainee.

In Fig. 4 I have shown my method and means applied to a circuit-tracing study apparatus. In this figure I employ a chart 16 which provides for an organized series of circuit-tracing problems, and in Fig. 5, I have shown a chart provided with the solutions to those circuit-tracing problems.

The circuit-tracing problems are established in not less than three categories, namely, (1) location of components from circuit designation (see Fig. 4); (2) location of components from a functional description of those components (see Fig. 4); and (3) location of components from an understanding of the circuit operation (see Fig. 4).

The section of my circuit-tracing study system providing the solutions to the various categories of problems comprises a chart 17 having lists 18, **18*a*, 18*b* of successively-positioned numbers opposite each of which is a component answer indication in columns 19, 19*a* and 19*b*** that are initially covered from view, but are adapted to be uncovered to expose each component answer individually.

Chart 17 may consist of a sheet of cardboard or heavy paper on which are printed indelibly the numbers, symbols or words comprising lists 18, **18*a*, 18*b*, 19 19*a* and 19*b*. To prevent a premature disclosure of the answers which are lists 19, 19*a* and 19*b*, these three lists are purposely covered so that the numbers, symbols or words thereof are hidden from the students' view. It will become apparent that one essential feature of the invention is that the student should be able to uncover the particular component answer he is interested in without disturbing the other covered answers. Accordingly, an opaque covering is applied to the columns 19, 19*a* and 19*b*. To satisfy the above-noted requirements, the opaque material should be of such character to permit easy removal, portion-by-portion. An ink is recommended as one agency for maintaining the secrecy of the answers. Since the answers of chart 17 are in column form, a ribbon-shaped strip of ink is applied over the answers after chart 17 is printed. To facilitate the use of chart 17**, it is desirable that the student be capable of removing the ink strip, or any selected portion of it, so that the answers are exposed without any difficulty. Accordingly, the ink is chosen to have a consistency that permits removal by simply rubbing it off, for example by a pencil eraser or a sharp implement such as a penknife.

Figure 5A:
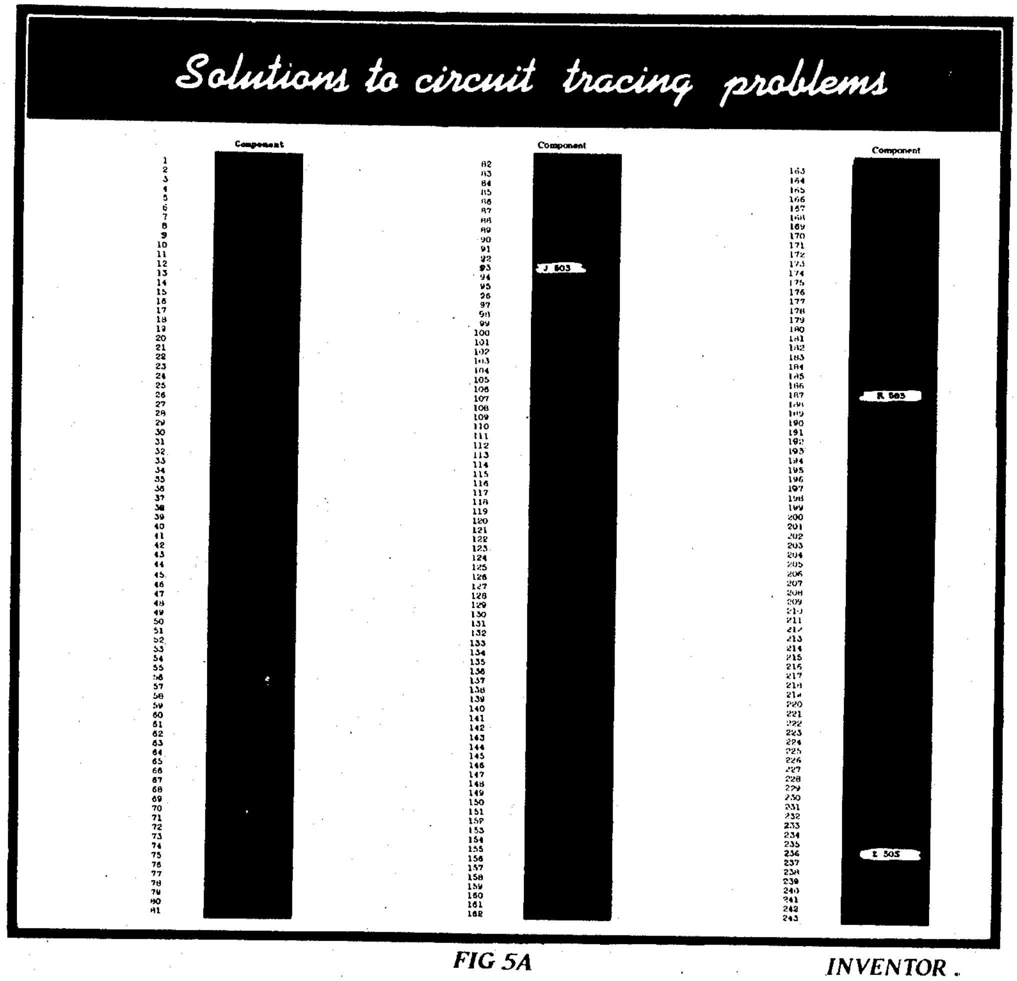
Fig. 5A is a chart embodying a list of solution indications similar to Fig. 5, some of which have been uncovered by the trainee in response to the problem questions propounded in Fig. 4.

Prior to the actual use of my system for circuit-tracing, the student or trainee will have, through previous instruction, been made familiar with the function of the individual components and circuits of the particular equipment. To train the student on category questions of the type 20 comprising location of components from circuit designation the student first reads the statement of the problem from the circuit-tracing chart 16. For example, problem No. 1 comprises locating Z505. To locate this component, he goes to chart 10 of Fig. 1 locates Z505 in the lower left-hand area of the schematic diagram (see pull-out, Fig. 1A); from there he goes to chart 13 of Fig. 2, where he locates Z505 in the upper left quadrant of the circuit wiring diagram 13 (see pull-out, Fig. 2D) and then goes to the pictorial diagrams of Fig. 3, where he locates what he believes to be Z505 on the upper left quadrant (see pull-out, Fig. 3F) of the equipment (which has been assigned an arbitrary number, viz., 236). To determine whether what he has located on the pictorial view of the receiver chassis and units is correct (see Fig. 3C), he proceeds from said Fig. 3C to the circuit-tracing testing chart 17, Fig. 5, and to the solutions area therein, goes down to number 236, moves over to the covered component answer column, and removes the covering material revealing the component answer, which in this case is Z505; see Fig. 5A.

Getting such an immediate response as to whether he has correctly located the component equipment proper is tantamount to the instructor presenting the problem and checking the student's solution.

In the type of problem in category 2, chart 16, **20*a*, viz., location of components from functional descriptions (based upon his understanding of his prior instruction as it pertains to the function of various components) is required to locate a particular component on the pictorial views Figs. 3A and 3C of the equipment shown therein. For example, to solve question No. 1, viz., locate the input potentiometer for the audio output stage, the student goes to diagram of chart 10 shown in Fig. 1, locates the audio output stage, which in this diagram is in the lower right-hand corner (see pull-out, Fig. 1B) and, based upon his understanding of prior instruction, determines that R583 is the part in question. He then goes to the diagram in chart 13 shown in Fig. 2 to locate the part R583, on the upper wall of the device (see pull-out, Fig. 2C), and from Fig. 2 the student goes to the pictorial representation in Fig. 3 (see pull-out, Fig. 3B) comprising bottom view from right side, and locates what he believes to be the answer in part number 187. From Fig. 3A he then goes to chart 17 in Fig. 5 comprising the circuit-tracing study apparatus and to the solutions column 18** goes down the columns to number 187 and removes the covering material to get the correct designation of the component, which in this example is R583; see Fig. 5A.

In the example of the third list **20*b* of circuit-tracing problems comprising the location of component from understanding of circuit operation, the student is asked questions that require his putting his previous instruction to actual practical use in the location of components on the equipment. For example, "Locate the component where you would make your first checks to find whether the receiver tubes were receiving plate voltage." comprises question No. 1 in said list 20*b*. The student, based upon his prior instruction on the equipment, would first go to the diagram in chart 10 of Fig. 1 and locate the component in question which he believes to be J503 (see pull-out, Fig. 1C), then progresses to the diagram on chart 13 of Fig. 2 where he locates J503 in the lower right-hand quadrant (see pull-out, Fig. 2B) and from Fig. 2 he then goes to the pictorial representation in Fig. 3 where he locates (see pull-out, Fig. 3E) a part in the lower right-hand section designated 93. To get his answer as to whether his analysis and location of the component is correct, he then goes to column 18 in chart 17 of Fig. 5 comprising the solutions columns, goes down the columns to number 93, removes the covering material and learns his answer, which in this example is J503**; see Fig. 5A.

In each one of these circuit-tracing problems, by utilizing the circuit-tracing diagrams, pictorial representations and answer charts, there has been accomplished:

1. Training in locating chassis circuits and components for an equipment, without the physical presence of the equipment;
2. Performance-testing of the student's ability to locate chassis circuits and components; and
3. Performance-testing of the trainee's understanding of equipment operation indirectly through location of functional parts.

*Troubleshooting*

In troubleshooting, the means used comprises the schematic diagram on chart 10, in Fig. 1; the wiring diagram on chart 13, in Fig. 2; the pictorial diagrams 3A and 3C; and in Figs. 6 and 7, the troubleshooting answer charts.

In this example, the procedure in relation to Figs. 1, 2 and 3 would be the same as that used in circuit-tracing. In Figs. 6 and 7, there are shown charts 21 and 22 in which are established certain conditions of the equipment which are reduced to a column of figures for various types of conditions of each component, covered from view. The result of the trainee's analysis, namely, component replacement is established in a series of numbers with the results in a corresponding column, also covered from view. Fig. 7 makes a statement under the heading: "trouble symptoms" of a maintenance trouble with its symptoms, and requires diagnosis of those trouble symptoms on the part of the student. The troubleshooting study and training apparatus will thus test his understanding of the operation of the equipment and will train him in the logical troubleshooting procedures which he was to have received in part from his previous instruction.

The example shown herewith is as follows:

Upon reading the trouble symptoms specified under the heading "trouble symptoms" in Fig. 7, the student, based upon his prior instruction and understanding thereof, proceeds to the schematic diagram in chart 10 of Fig. 1 to locate the channel and circuit affected, which in this example is the last stage of the BDI channel V510 (see pull-out, Fig. 1D). His prior instruction leads him, in this particular case, to check the signal condition of the plate and grid of V510, namely, pin 8 and pin 4 respectively. To do this, he returns to chart 22 of Fig. 6, goes to the socket for V510, namely X510, goes down to pin 8, over to the signal condition column and removes the covering material, as particularly shown in Fig. 8. This reveals a statement of the signal condition. To check the grid of tube V510 he would go to pin 4 of X510 and over to the signal condition column in chart 22 where he removes the covering material and reads a statement of signal condition (see Fig. 8). Based upon his understanding of circuit operation, he determines from the statement that the trouble is in this particular stage of the receiver. Additional logical checks on this stage will establish a voltage measurement and a resistance measurement on pin 8 of socket X510 on chart 22 of Fig. 6 by removing the covering material in the voltage column and in the resistance column (see Fig. 8). The information revealed by removing the covering substance indicates further information to the student who, by further logical deduction, concludes that the trouble is in a particular component and should this component be replaced, the trouble would be corrected.

In this example, he would believe that replacing resistor R542 would correct the trouble. To determine whether his findings are correct and to further check on his ability to simulate the actual replacement of a component, the student goes to the diagrams of Figs. 1 and 2, locates the component R542 in the lower left-hand quadrant of the equipment (see pull-outs 1D, 2A and 2E), proceeds to the pictorial representation in Fig. 3 wherein the lower left-hand quadrant of Fig. 3C (see pull-out, Fig. 3D) he will come across a component number 148 which he believes is the part he wants to replace. To obtain an immediate answer as to whether this is the part that will correct the trouble, the student returns to the chart 21 of Fig. 7, goes to the results of the component replacements column (for example, item 148), and removes the covering material in the corresponding result column, which uncovering in this particular example reveals a designated "TC" as more particularly shown in Fig. 9, which letters "TC" mean "Trouble Corrected." Should, in this example, he have uncovered a component other than the correct component he would have uncovered the answer "SR" which means "Symptoms Remain."

In this manner, the student has gone through the analysis of a maintenance and servicing problem. He has made certain determinations and findings which lead him to conclude that the replacement of a particular component or components will correct the trouble. Upon his resolving upon a component or components, he proceeds to locate those components on the simulated equipment, namely, the pictorial view of Fig. 3. He proceeds from having located the presumably faulty component or components on Fig. 3 to the troubleshooting component replacement chart (Fig. 7) and upon removal of the covering material on the component replacement result column gets an immediate answer as to whether or not his diagnosis of the trouble is correct; such removed covering material is particularly shown in Fig. 9.

By these methods and means there have been provided for the student:

1. Training in logical troubleshooting procedures, enabling him to locate faulty components without the real equipment, and 2. Performance-testing of the trainee's knowledge of logical troubleshooting procedures by means of practical troubleshooting problems which will result in locating a faulty component.

My preferred means for producing the covered columns of answers in the various charts hereinabove specified comprises, first, indelibly printing such answers in the paper of the chart, and secondly, the complete covering of such column of answers by the use over the answers of a readily-removable colored ink.

It will be understood that other means than the covered columns may be used for testing the accuracy of answers of the trainee; for example, a column of component indications may be printed in invisible ink, which upon the application of a suitable chemical may be individually brought to disclosure, but in all cases, whether the column of components is covered or utilized in invisible ink, the components will be listed alongside an identifying column of sequentially arranged numerals or the like, such as hereinabove shown and described.

Having described my invention, I claim:

1. Simulation apparatus for self-instruction of trainees in circuit-tracing and troubleshooting of complicated multi-component equipment and for recording the answers of trainees, comprising a chart showing the equipment and having key symbols thereon identifying the components of said equipment, and a suitable medium having answers to questions relating to said equipment printed indelibly thereupon, said symbols of said components chart also appearing on said answer medium and being associated with correlated answers to assist in the selection of individual answers, and an opaque covering for each of such answers, said covering being sectionally removable to separately expose answers imprinted upon said medium.

2. Simulation apparatus for the instruction of a trainee concerning multi-component equipment and for recording and checking the trainee's responses to a problem based upon the equipment-simulation, comprising a chart disclosing the components of said equipment, said components being identified by symbols on said chart, a response chart having printed thereon a group of responses related to the problem, and a removable ink covering for said responses, and also having symbols of said components chart repeated on said response chart so that each symbol is associated with a correlated response, said ink having the property of being removable section-by-section so that each response may be exposed to view individually one at a time.

3. Simulation apparatus for the instruction of a trainee concerning the identification, location, function, operation, adjustment and/or troubleshooting of components of a multi-component equipment and for tracking the trainee's responses to a problem based upon the equipment-simulation, comprising a chart disclosing a pictorial view of said equipment illustrating said components, said components being identified by arbitrary symbols in said pictorial view, a chart having printed thereon a group of responses related to the problem and also having the symbols of said equipment chart repeated on said response chart, said symbols being associated with correlated responses, and a removable opaque ink covering for each of said responses to maintain the secrecy thereof, said ink being permanently removable section-by-section so that each response may be exposed to view individually one at a time.

4. Simulation apparatus for the instruction of a trainee concerning multi-component equipment and for recording and checking the responses to a problem submitted to the trainee, comprising a chart disclosing the components of said equipment, said components being identified by symbols on said chart, and a response chart having thereon a group of responses related to the probelm, said symbols of said component chart also being displayed on said response chart so that each symbol is associated with a correlated response, said responses being invisibly recorded on said response chart and being capable of selectively and individually rendered visible by the trainee.

5. Apparatus as defined in claim 4 wherein the invisibility of said responses is maintained by an easily removable irreplaceable opaque covering overlying said responses, said opaque covering having the property of being rubbed off section-by-section so that predetermined individual responses may be exposed one at a time.

6. Apparatus as defined in claim 4, wherein the invisibility of said responses is effected by printing said responses with invisible ink and disclosure of individual responses may be effected by the application of a suitable chemical.

7. Simulation apparatus for the self-instruction of trainees with regard to a study problem based upon multi-component equipment comprising, a suitable medium disclosing the multi-component equipment under consideration and having key symbols visibly printed thereon and identifying the components of said equipment, a suitable medium having printed thereon responses to problems relating to said components, said responses simulating equipment operation, the symbols of said component medium also being repeated on said response medium and being associated with correlated responses to permit the trainee to select individual responses, and a removable adhering opaque covering overlaying said responses, said covering being adaptable to section-by-section removal so that individual responses may be uncovered one at a time as desired by the trainee.

8. Simulation apparatus for the self-instruction of a trainee with regard to a study problem based upon multi-component equipment comprising, a chart disclosing the multi-component equipment and having visible key symbols identifying the components of said equipment, a chart embodying a plurality of answers to questions relating to said equipment, said symbols of said components chart also being visibly repeated on said answer chart and associated with correlated answers and thereby identifying said answers and permitting the selection of individual answers by the trainee, a removable opaque covering overlaying said answers, said covering being sectionally removable so that individual answers may be exposed to view by altering the portion of said covering overlaying the selected answer.

9. Simulation apparatus for self-testing the accuracy of a person in solving a study problem based upon multi-component equipment comprising, a chart illustrating the multi-component equipment under study and having symbols visibly printed thereon and identifying the components of said equipment, a chart having responses imprinted thereon and also having said symbols of said component chart repeated thereon, said symbols being associated with correlated responses to assist in the selection of individual responses, said responses simulating predetermined conditions of operation at selected locations of said equipment, said responses being invisibly recorded on said response chart and being capable of selectively and individually rendered visible by the person.

10. Apparatus as defined in claim 9 wherein the invisibility of said responses is effected by a removable opaque covering overlying said responses, said covering being sectionally removable so that individual responses may be exposed to view one at a time.

11. Simulation apparatus for self-testing the accuracy of a person in solving a complicated multi-component study problem comprising, a chart illustrating the subject of the study problem and having symbols thereon exposed to view at all times and identifying the components of the subject under study, and a chart having responses imprinted thereon and also having said symbols of said problem chart repeated thereon, said symbols being associated with correlated responses to assist in the selection of individual responses, said responses simulating predetermined conditions of operation established by the study problem, said responses being invisibly recorded on said response chart and being capable of selectively and individually rendered visible by the person.

12. Apparatus as defined in claim 11 wherein the invisibility of said responses is effected by a removable opaque ink overlying said responses, said ink being sectionally removable to permit separate exposure of individual responses.

References Cited in the file of this patent

UNITED STATES PATENTS

| | | |
|---|---|---|
| 1,982,611 | Hartnett | Nov. 27, 1934 |
| 2,179,168 | Alexander | Nov. 7, 1939 |
| 2,305,972 | Lorber | Dec. 22, 1942 |
| 2,380,657 | Lorber | July 31, 1945 |
| 2,410,800 | Baumgartner | Nov. 12, 1946 |
| 2,459,231 | Lorber | Jan. 18, 1949 |